US012271851B2

(12) United States Patent
Lu et al.

(10) Patent No.: US 12,271,851 B2
(45) Date of Patent: Apr. 8, 2025

(54) COMPUTER-BASED RISK ANALYSIS AND MITIGATION

(71) Applicant: International Business Machines Corporation, Armonk, NY (US)

(72) Inventors: Fang Lu, Billerica, MA (US); Jeremy R. Fox, Georgetown, TX (US); Tushar Agrawal, West Fargo, ND (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 17/805,703

(22) Filed: Jun. 7, 2022

(65) Prior Publication Data

US 2023/0394410 A1 Dec. 7, 2023

(51) Int. Cl.
*G06Q 10/0635* (2023.01)
*G06N 5/022* (2023.01)
*G06Q 10/0639* (2023.01)

(52) U.S. Cl.
CPC ......... *G06Q 10/0635* (2013.01); *G06N 5/022* (2013.01); *G06Q 10/0639* (2013.01)

(58) Field of Classification Search
None
See application file for complete search history.

(56) References Cited

U.S. PATENT DOCUMENTS

| 7,317,406 | B2 | 1/2008 | Wolterman | |
|---|---|---|---|---|
| 10,156,848 | B1 | 12/2018 | Konrardy | |
| 10,831,191 | B1 | 11/2020 | Fields | |
| 11,276,501 | B1 * | 3/2022 | Brook | G16H 40/67 |
| 11,386,498 | B1 * | 7/2022 | Leise | G06Q 40/08 |
| 11,416,942 | B1 * | 8/2022 | Leise | G07C 5/0816 |
| 11,574,206 | B2 * | 2/2023 | Butler, Jr. | G08B 13/122 |
| 2017/0129602 | A1 * | 5/2017 | Alduaiji | G06Q 30/0251 |
| 2020/0156654 | A1 * | 5/2020 | Boss | A61B 5/12 |
| 2020/0193341 | A1 * | 6/2020 | Barak | G06Q 10/06375 |
| 2020/0202472 | A1 * | 6/2020 | Barak | H04W 4/021 |
| 2021/0150874 | A1 * | 5/2021 | Turano | H04L 12/2809 |

(Continued)

FOREIGN PATENT DOCUMENTS

CN 1841422 B 8/2015

OTHER PUBLICATIONS

"Accident Prevention Plan", University of Washington, Revised Jul. 2021, 22 pages.

(Continued)

*Primary Examiner* — Mehmet Yesildag
(74) *Attorney, Agent, or Firm* — Joseph P. Curcuru

(57) ABSTRACT

In an approach to improve risk assessment and management, embodiments monitor a predetermined area by collecting, by one or more sensing devices, data related to environmental conditions and spatial relationships between one or more objects in the predetermined area. Further, embodiments determine, based on a model and the monitoring, that an accidental event is likely to occur within a predetermined distance or within the predetermined area. Additionally, embodiments identify a predetermined mitigation action from a knowledge corpus to apply to the accidental event; and proactively implementing the identified mitigation action to prevent or manage the accidental event.

20 Claims, 5 Drawing Sheets

(56) References Cited

U.S. PATENT DOCUMENTS

| | | | |
|---|---|---|---|
| 2021/0166483 A1* | 6/2021 | Kozloski | G06T 19/20 |
| 2021/0269022 A1 | 9/2021 | Newman | |
| 2022/0363254 A1* | 11/2022 | Baek | B60W 50/14 |

OTHER PUBLICATIONS

"Accident Risk Object Avoidance", An IP.com Prior Art Database Technical Disclosure, Disclosed Anonymously, IP.com No. IPCOM000263872D, IP.com Electronic Publication Date: Oct. 13, 2020, 9 pages.

"Method and System for Accident Propagation Path Visualization to Identify Accident Location on Any Industrial Floor", An IP.com Prior Art Database Technical Disclosure, Disclosed Anonymously, IP.com No. IPCOM000267242D, IP.com Electronic Publication Date: Oct. 11, 2021, 3 pages.

"Safety Risk Mitigations and Corrective Actions", Federal Transit Administration, Guide, Version 1, Oct. 2019, 8 pages.

"System for assessing next worst driving consequences based on real time analysis of human behavior to alert/prevent potential emergency situation", An IP.com Prior Art Database Technical Disclosure, Disclosed Anonymously, IP.com No. IPCOM000254255D, IP.com Electronic Publication Date: Jun. 14, 2018, 6 pages.

"Theories of Accident Causation", Cleveland State University, Work Zone Safety and Efficiency Transportation Center, Section 3, Accident Theories, 2017, 26 pages.

"Using Artificial Intelligence for Emergency Management", EKU Online, Blog, last printed May 27, 2022, 10 pages, <https://safetymanagement.eku.edu/blog/the-benefits-challenges-of-using-artificial-intelligence-for-emergency-management/>.

Barachi, et al., "An artificial intelligence based crowdsensing solution for on-demand accident scene monitoring", Procedia Computer Science, vol. 170, 2020, pp. 303-310, <https://www.sciencedirect.com/science/article/pii/S1877050920304737?via%3Dihub>.

VB Staff, "Applying machine learning to keep employees safe and save lives", Venture Beat, Sep. 29, 2020, 8 pages, <https://venturebeat.com/2020/09/29/applying-machine-learning-to-keep-employees-safe-and-save-lives/>.

* cited by examiner

COMPUTER-BASED RISK ANALYSIS AND MITIGATION

BACKGROUND OF THE INVENTION

The present invention relates generally to the field of risk assessment, and more particularly to the field of computer-based risk assessment and mitigation.

Risk is made up of two parts: the probability of something going wrong, and the negative consequences if it does. Risk can be hard to spot, however, let alone to prepare for and manage. And, if you're hit by a consequence that you hadn't planned for, costs, time, and reputations could be on the line. Similarly, overestimating or overreacting to risks can create panic, and do more harm than good. This makes Risk Analysis an essential tool. It can help you to identify and understand the risks that you could face in your role. In turn, this helps you to manage these risks, and minimize their impact on your plans. By approaching risk in a logical manner, you can identify what you can and cannot control, and tackle potential problems with measured and appropriate action. This can then help to alleviate feelings of stress and anxiety, both in and outside of work.

Risk Analysis is a process that helps you to identify and manage potential problems that could undermine key business initiatives or projects. However, it can also be applied to other projects outside of business, such as organizing events or even buying a home. To carry out a Risk Analysis, you must first identify the possible threats that you face, then estimate their likely impacts if they were to happen, and finally estimate the likelihood that these threats will materialize. Risk Analysis can be complex, as you'll need to draw on detailed information such as project plans, financial data, security protocols, marketing forecasts, and other relevant information. However, it's an essential planning tool, and one that could save time, money, and reputations.

SUMMARY

Embodiments of the present invention disclose a computer-implemented method, a computer program product, and a system for risk assessment and management within a predetermined area, the computer-implemented method comprising: monitoring the predetermined area, wherein monitoring comprises: collecting, by one or more sensing devices, data related to environmental conditions and spatial relationships between one or more objects in the predetermined area; determining, based on a model and the monitoring, that an accidental event is likely to occur within a predetermined distance or within the predetermined area; identifying a predetermined mitigation action from a knowledge corpus to apply to the accidental event; and proactively implementing the identified mitigation action to prevent or manage the accidental event.

DETAILED DESCRIPTION

Embodiments of the present invention recognize that in any industrial surrounding there can be various types of accidental scenarios, like fire, water leakage, steam leakage, and/or any other known leakage scenarios. For different types of accidental scenarios, there can be different objects in the surrounding area that may aggravate and potentially enhance any damage. For example, a battery and a fuel tank surrounded by an industrial fire will aggravate the damage resulting in increased damages and higher repair costs. Additionally, various elements may add to the potential risks of an accidental scenario. Further, embodiments of the present invention recognize that isolation of such identified damage aggravated objects is important reduce the potential damage of an accident and reduce costs.

Embodiments of the present invention recognize that on any industrial floor, there may be various types of objects that may aggravate an ongoing accidental scenario and increase the potential damage and cost of the ongoing accidental scenario (e.g., fuel tank, battery, acid, chemical, and/or gas cylinder in an industrial fire). The aggravating objects can be part of any machine and/or industrial floor thus isolating such objects from the accidental event is very important to reduce damages and cost. However, embodiments of the present invention recognize that there is currently no solution known in the art.

Embodiments improve the art and solve the particular issues stated above by (i) generating a knowledge corpus comprising: physical and chemical properties of objects in a physical space; potential hazards caused by interactions between the objects; potential hazards caused by environmental conditions in the physical space; and historical data about causes and outcomes of accidents occurring in the physical space, (ii) training a model for predicting hazards in the physical space based on the knowledge corpus, (iii) monitoring the physical space, wherein the monitoring comprising: collecting, via sensing devices, information related to the environmental conditions and spatial relationships between the objects in the physical space, (iv) determining, based on the model and the monitoring, that a hazard is likely to occur in the physical space, (v) determining whether there is an automated action for mitigating the accident.

An object may be any form or type of physical or digital object known and understood by a person having ordinary skill in the art. For example, but not limited to, physical containers, hazardous materials, various liquids and gases, and software programs. An aggravation object is an object that would escalate an identified event. Event and accidental event are interchangeable terms.

Implementation of embodiments of the invention may take a variety of forms, and exemplary implementation details are discussed subsequently with reference to the Figures (i.e., FIG. 1-FIG. 5).

Figure 1:
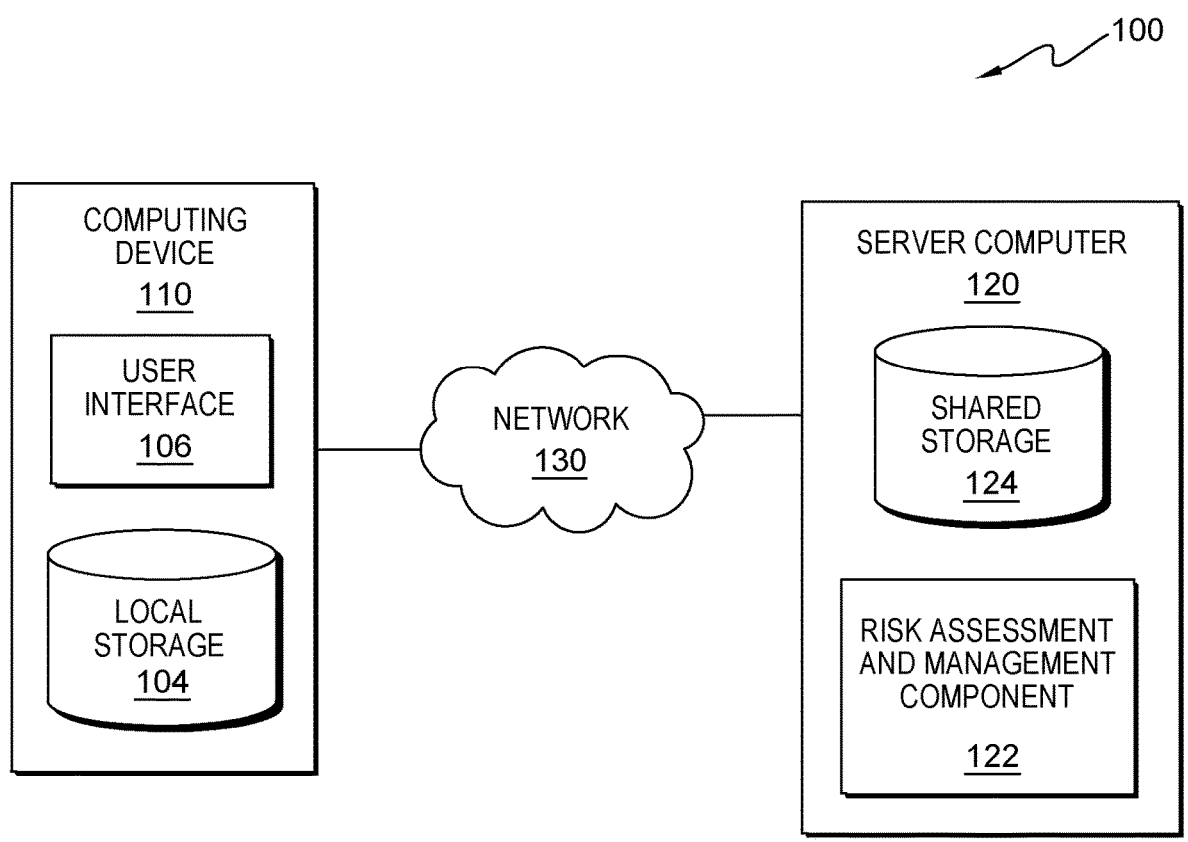
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. Distributed data processing environment 100 includes computing device 110 and server computer 120 interconnected over network 130.

Network 130 may be, for example, a storage area network (SAN), a telecommunications network, a local area network (LAN), a wide area network (WAN), such as the Internet, a wireless technology for exchanging data over short distances (using short-wavelength ultra-high frequency (UHF) radio waves in the industrial, scientific and medical (ISM) band from 2.4 to 2.485 GHz from fixed and mobile devices, and building personal area networks (PANs) or a combination of the three), and may include wired, wireless, or fiber optic connections. Network 130 may include one or more wired and/or wireless networks that may receive and transmit data, voice, and/or video signals, including multimedia signals that include voice, data, text and/or video data. In general, network 130 may be any combination of connections and protocols that will support communications between computing device 110 and server computer 120, and any other computing devices and/or storage devices (not shown in FIG. 1) within distributed data processing environment 100.

In some embodiments of the present invention, computing device 110 may be, but is not limited to, a standalone device, a client, a server, a laptop computer, a tablet computer, a netbook computer, a personal computer (PC), a smart phone, a desktop computer, a smart television, a smart watch, a radio, a stereo system, a cloud based service (e.g., a cognitive cloud based service), AR glasses, a virtual reality headset, any HUD known in the art, and/or any programmable electronic computing device capable of communicating with various components and devices within distributed data processing environment 100, via network 130 or any combination therein. In general, computing device 110 may be representative of any programmable computing device or a combination of programmable computing devices capable of executing machine-readable program instructions and communicating with users of other computing devices via network 130 and/or capable of executing machine-readable program instructions and communicating with server computer 120. In some embodiments computing device 110 may represent a plurality of computing devices.

In some embodiments of the present invention, computing device 110 may represent any programmable electronic computing device or combination of programmable electronic computing devices capable of executing machine readable program instructions, manipulating executable machine-readable instructions, and communicating with server computer 120 and other computing devices (not shown) within distributed data processing environment 100 via a network, such as network 130. Computing device 110 may include an instance of user interface (interface) 106, and local storage 104. In various embodiments, not depicted in FIG. 1, computing device 110 may have a plurality of interfaces 106. In other embodiments, not depicted in FIG. 1, distributed data processing environment 100 may comprise a plurality of computing devices, plurality of server computers, and/or one a plurality of networks. Computing device 110 may include internal and external hardware components, as depicted, and described in further detail with respect to FIG. 5.

User interface (interface) 106 provides an interface to risk assessment and management component (component) 122. Computing device 110, via user interface 106, may enable a user and/or a client to interact with component 122 and/or server computer 120 in various ways, such as sending program instructions, receiving program instructions, sending and/or receiving messages, updating data, sending data, inputting data, editing data, collecting data, and/or receiving data. In one embodiment, interface 106 may be a graphical user interface (GUI) or a web user interface (WUI) and may display at least text, documents, web browser windows, user options, application interfaces, and instructions for operation. interface 106 may include data (such as graphic, text, and sound) presented to a user and control sequences the user employs to control operations. In another embodiment, interface 106 may be a mobile application software providing an interface between a user of computing device 110 and server computer 120. Mobile application software, or an "app," may be designed to run on smart phones, tablet computers and other computing devices. In an embodiment, interface 106 may enable the user of computing device 110 to at least send data, input data, edit data (annotations), collect data and/or receive data.

Server computer 120 may be a standalone computing device, a management server, a web server, a mobile computing device, one or more client servers, or any other electronic device or computing system capable of receiving, sending, and processing data. In other embodiments, server computer 120 may represent a server computing system utilizing multiple computers such as, but not limited to, a server system, such as in a cloud computing environment. In another embodiment, server computer 120 may represent a computing system utilizing clustered computers and components (e.g., database server computers, application server computers, etc.) that act as a single pool of seamless resources when accessed within distributed data processing environment 100. Server computer 120 may include internal and external hardware components, as depicted, and described in further detail with respect to FIG. 5. In some embodiments server computer 120 may represent a plurality of server computers.

Each of shared storage 124 and local storage 104 may be a data/knowledge repository and/or a database that may be written and/or read by one or a combination of component 122, server computer 120 and computing device 110. In some embodiments, each of shared storage 124 and local storage 104 may be a data/knowledge repository, a knowledge base, a knowledge center, a knowledge corpus, and/or a database that may be written and/or read by one or a combination of component 122, server computer 120 and computing device 110. In the depicted embodiment, shared storage 124 resides on server computer 120 and local storage 104 resides on computing device 110. In another embodiment, shared storage 124 and/or local storage 104 may reside elsewhere within distributed data processing environment 100, provided that each may access and is accessible by computing device 110 and server computer 120. Shared storage 124 and/or local storage 104 may each be implemented with any type of storage device capable of storing data and configuration files that may be accessed and utilized by server computer 120, such as, but not limited to, a database server, a hard disk drive, or a flash memory. In various embodiments, not depicted in FIG. 1, in addition to shared storage 124, server computer comprises a primary and a secondary database, described below in FIG. 5.

In the depicted embodiment, component 122 is executed on server computer 120. In other embodiments, component 122 may be executed on computing device 110. In various embodiments of the present invention, not depicted in FIG. 1, component 122 may execute on a plurality of server computers 120 and/or on a plurality of computing devices 110. In some embodiments, component 122 may be located and/or executed anywhere within distributed data processing environment 100 as long as component 122 is connected to and/or communicates with, computing device 110, and/or server computer 120, via network 130. In various embodiments, not depicted in FIG. 1, component 122 comprise various components (see FIGS. 2-3).

Component 122 may identify the presence of different objects in surrounding area that may aggravate an identified or anticipated accidental event based historical learning, wherein the surrounding area is a predetermined area, space, or location. Accordingly, in various embodiments, component 122 may isolate the identified objects from the surrounding area proactively to manage or prevent the accidental event. Component 122 may perform a computer risk-based analysis, through artificial intelligence (AI) and traditional computing, to identify potential threats, wherein component 122 applies one or more remedies to manage the identified potential threats. In various embodiments, component 122 identifies and isolates objects in an accidental event. In one embodiment, based on an identified active or potential accidental event, component 122 identifies one or more objects in a predetermined area that may act as a aggravator to the potential or active accidental event. Component 122 may proactively isolate the one or more identified objects from the predetermined area. An accidental event may be any dangerous or harmful physical or digital event. For example, but not limited to, a fire, a flood, electrical hazards, chemical spill, structural damage, and/or software virus.

Component 122 may protect or remove aggravation objects (i.e., objects) in the predetermined area. In various embodiments, based on the type/category of the identified aggravation object(s), component 122 identifies whether the one or more identified aggravation objects should be covered with a predetermined protective layer or whether the one or more identified aggravation objects should be removed from the predetermined surrounding to prevent or reduce the impact of an anticipated or active accidental event. Component 122 may consider the potential energy in the surrounding the predetermined area when identifying aggravation objects and/or potential accidental events. In various embodiments component 122 identifies the potential energy stored within the aggravation object. Potential energy can be any form of potential energy known and understood in the art. For example, but not limited to, the amount of fuel, battery power, gas, or chemicals stored within the object. Component 122 may prioritize management of the identified aggravation objects based on the identified potential energy of the aggravation objects.

Component 122 may identify an accidental pattern and mitigation technique associated with the accidental event and/or pattern. In various embodiments, component 122 identifies the propagation pattern of one or more accidental events and one or more types of mitigation techniques that are or can be applied to the one or more accidental events. Component 122 may predict, within an estimated range of time, when the aggravation objects will be impacted and take proactive action to isolate and/or shield the aggravation objects from the accidental event accordingly. Component 122 may proactively manages one or more identified aggravation objects through a control system. A control system may be a physical or digital system of internal and external control functions as they are known and understood in the art and/or a robotic system. A robotic system may one or more systems that provide intelligent services and information by interacting with their environment, including human beings, via the use of various sensors, actuators, and human interfaces, wherein the interaction with the environment may be conducted through automated and/or manual functions, commands, and/or movement. A mechanical system may be any service or action that uses machines (e.g., plumbing, elevators, escalators, sprinkler systems, and heating and air-conditioning systems).

In various embodiments, based on the identified type(s) of the accidental event and identified types of aggravation objects, component 122 initiates and/or controls a robotic system, mechanical system, automated guided vehicles, computer based control setting, and/or any other internal and external control functions or devices known in the art to manage the accidental event and mitigate risk. For example, using a robotic system, via robotic arms and automated mechanical functions, to remove the aggravation objects from the predetermined surrounding in a proactive manner. Component 122 may prevent an anticipated accidental event. In various embodiments, component 122 identifies if a physical support should be provided or if an obstacle should be created to prevent the propagation of the accidental event while protecting the aggravation objects from the accidental event. A predetermined area may be one or more predefined digital and/or physical areas and/or locations.

While aspects discussed herein relate to physical industrial and digital software space. Other examples include computing and related electrical and computer technology, information aggregation and processing, information organization and management, medical technology, scientific experimentation, nanotechnology, military technology, manufacturing, communication systems (e.g., networks of satellites, ground relay stations, communication security to include coordination of channels and encryption, etc.) maintenance (e.g., physical maintenance of a plant or machine, cleaning of an area, or disk maintenance in a data facility, etc.), distribution and logistics (e.g., restocking shelves from a supply closet, moving heavy equipment internationally piecemeal or together, etc.), construction and physical engineering (e.g., stacking bricks, encountering a water obstacle and implementing the best means of crossing it, etc.), gaming, distributed management or control systems (e.g., factory control systems, information technology hubs, etc.), etc. Upon consideration of the disclosures herein, those skilled in the art will recognize the application of these techniques in other settings where more than one devices sharing common functionality is engaged in a dividable task. It is to be appreciated that this list of other examples are not intended to be limiting with regard to where aspects disclosed herein can be practiced.

Figure 2:
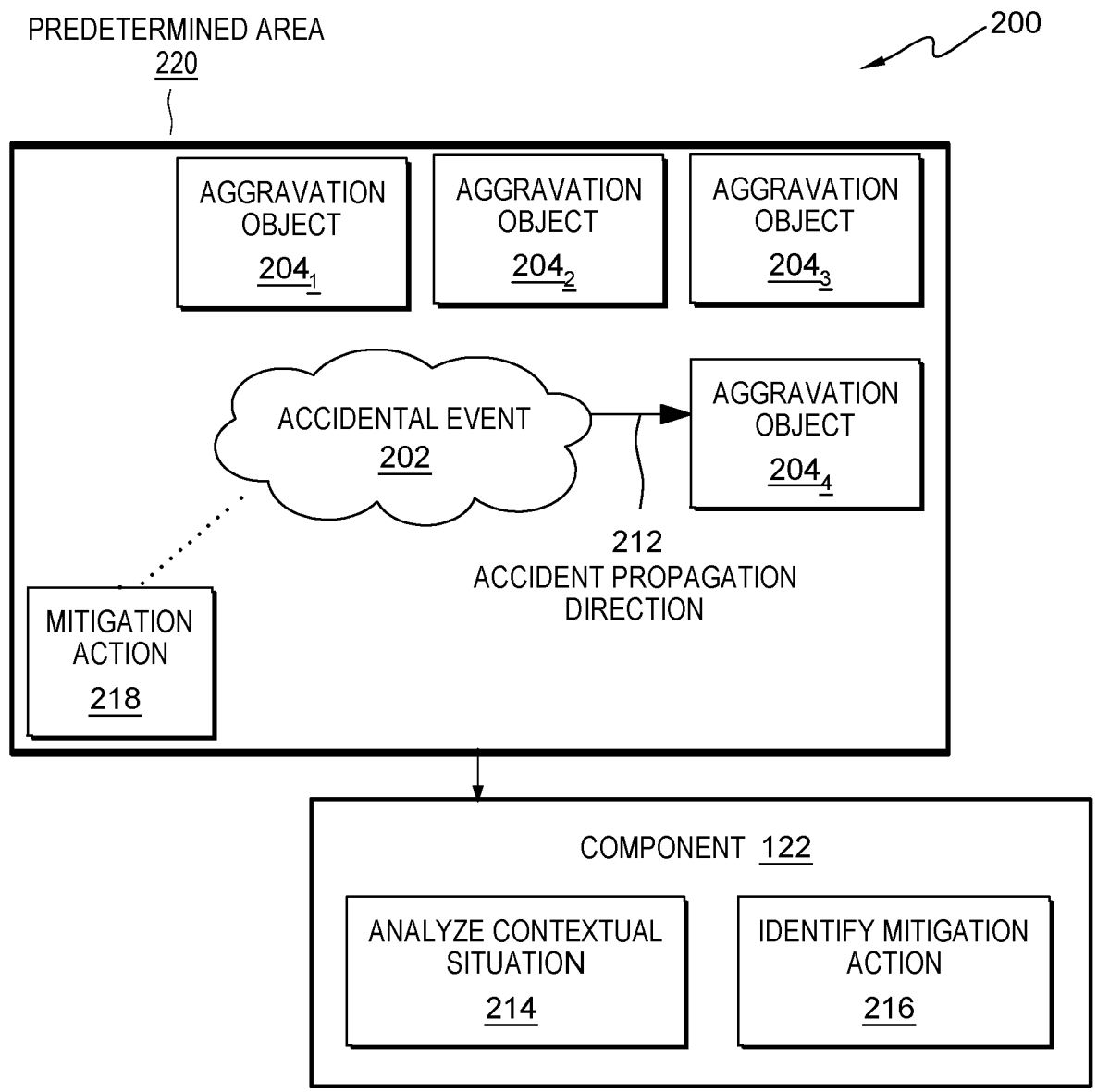
FIG. 2 is a functional block diagram illustrating a distributed data processing environment of a risk assessment and management component, in accordance with an embodiment of the present invention.

For example, FIG. 2 depicts one embodiment of component 122 managing identified aggravation objects within a detected accidental event. In the depicted embodiment, environment 200 comprises accidental event 202, various aggravation objects $204_1$-$204_4$, hereinafter aggravation object(s) 204, (e.g., a gas cylinder, a chemical barrel, a battery, and a diesel tank), mitigation action 218, and accident propagation direction 212 within predetermined area 220, and component 122. In various embodiments, component 122 executes and manages mitigation action 218. In the depicted embodiment, component 122 has identified that accident propagation direction 212 of accidental event 202 is directed toward aggravation object(s) 204. In various embodiments, component 122, via an artificial intelligence (AI) enabled system, analyzes contextual situation 214, and based on the output of the analyzed contextual situation, component 122 identifies a mitigating action 216 to perform on aggravating object(s) 204 and/or accidental event 220.

In one particular example, accidental event 202 is a fire in a storage warehouse. In this example, component 122, via various sensors, cameras, and an AI system, identifies, monitors, and tracks the fire in the storage warehouse. Further, component 122, via a shared or central database, cameras, and an AI system, identify aggravation object(s) 204 (e.g., gasoline tanks) by scanning the warehouse for predetermined aggravation objects and retrieving preestablished object lists from one or more databases or repositories. The preestablished object list may comprises, but is not limited to, an inventory list of objects, the contents of the objects, the chemical composition of the objects, the location of the object within a predetermined area (e.g., environment 200), care and maintenance instructions, and/or any hazardous warnings associated with the object. In this example, component 122 identifies a gas cylinder, chemical barrel, a battery, and diesel tank within environment 200 to be aggregation object(s) $204_1$-$204_4$, respectfully. In other embodiments, environment 200 comprises $204_1$-$204_N$, wherein N represents a positive integer, and accordingly the number of scenarios implemented in a given embodiment of the present invention is not limited to those depicted in FIG. 2. In this example, component 122 identifies that the fire (i.e., accidental event 202) is traveling (i.e., accident propagation direction 212) toward the diesel tank (i.e., aggravation object $204_4$), wherein based on the propagation direction of the fire, component 122 initiates and manages mitigation action 218 (e.g., a water dispensing system, wherein component 122 directs the water dispensing system to focus on the propagation direction of the fire and the diesel tank). In other examples, component 122 utilizes the water dispenser system to contain the fire in its current position and extinguish the fire.

Component 122 may identify a mitigating action by analyzing previously stored and previously programmed mitigation actions associated with an accidental event from a database. In some embodiments, component 122 identifies and implements mitigation action 218 from a predetermined list of mitigation actions associated with an accidental event. For example, if component 122 detects malware within a system component 122 may execute a serious of predefined tasks to mitigate the risk and damage (e.g., shutting down one or more servers, altering an end user, disabling network connection, and/or any other mitigation techniques known in the art).

FIG. 2 is a functional block diagram illustrating a distributed data processing environment, generally designated environment 200, detailing component 122, in accordance with one embodiment of the present invention. The term "distributed" as used in this specification describes a computer system that includes multiple, physically distinct devices that operate together as a single computer system. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

Figure 3:
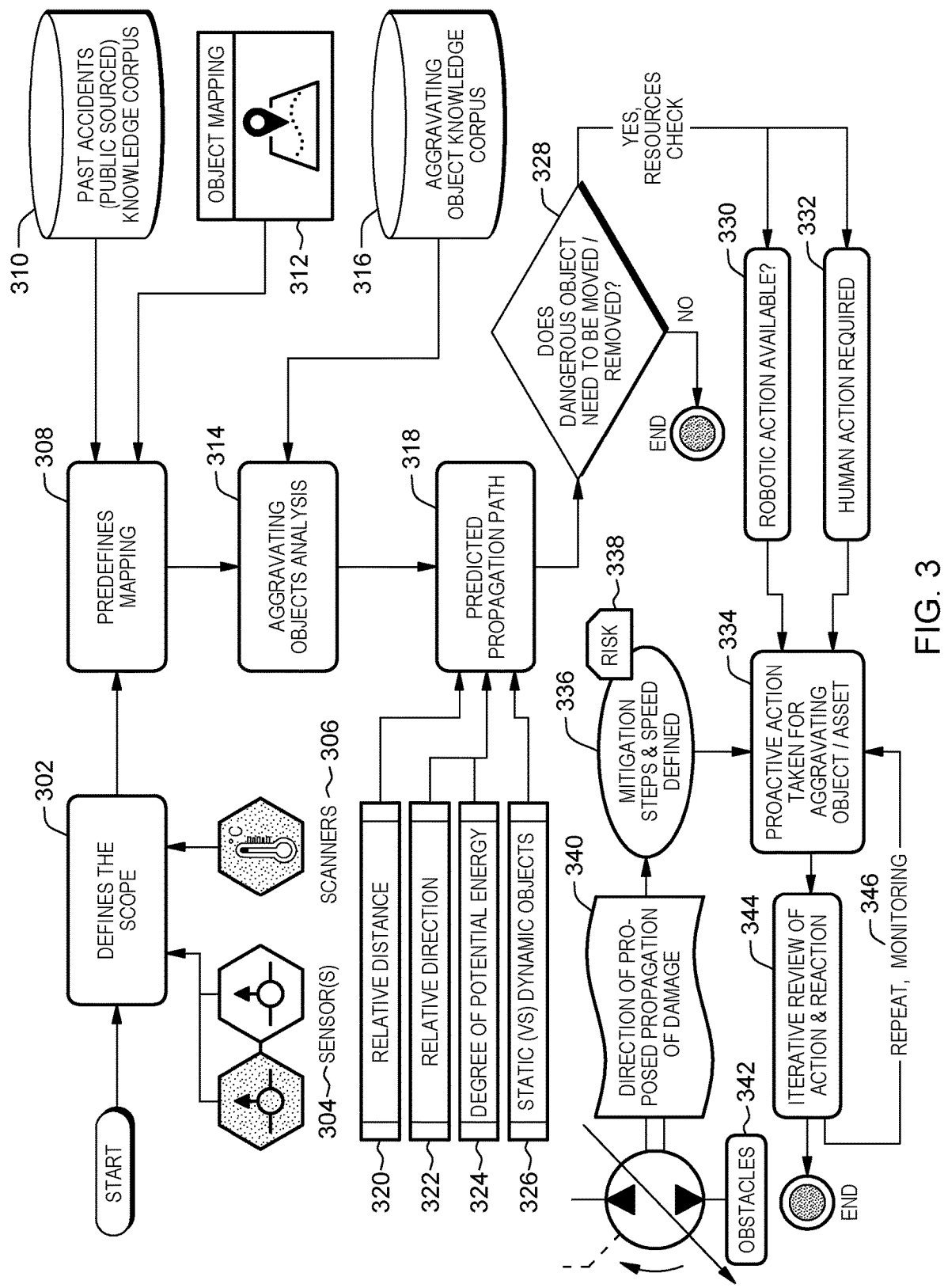
FIG. 3 illustrates operational steps of the risk assessment and management component, for computer-based risk assessment and management, in accordance with an embodiment of the present invention.

FIG. 3 is a functional block diagram illustrating a distributed data processing environment, generally designated 100, detailing knowledge query refinement, in accordance with one embodiment of the present invention. The term "distributed" as used in this specification describes a computer system that includes multiple, physically distinct devices that operate together as a single computer system. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

In the depicted embodiment, component 122 defines the scope of a contextual scenario/situation 302 by utilizing sensor(s) 304 and various scanning enabled systems (scanners) 306 (e.g., internet of things (IoT) scanning and thermal imaging, respectively). In various embodiments, component 122, via IoT devices and sensors (i.e., sensor(s) 304) and various scanners 306 (e.g., thermal scan), analyzes the received video feed and sensor feedback to identify an accidental event within a predetermined area and generates a defined scope of the layout of the predefined area and objects within the predefined area. IoT devices may be hardware devices, such as sensors, actuators, gadgets, appliances, cameras, or machines, that are programmed for certain applications and can transmit data over the internet or other networks. A sensor is a device that detects or measures a physical or digital property and then records or otherwise responds to that property, such as vibration, chemicals, radio frequencies, environment, weather, humidity, light, etc. Component 122 may identify the types of accidental events, the criticality of the accidental events, and the types of objects that can aggravate an accidental event in the predetermined area based on the feedback from the received video and sensor feedback. In the depicted embodiment, component 122 predefines the mapping of identified aggravation objects 308. Component 122 may have a predefined mapping of the aggravation objects with the types of accidental events. In the depicted embodiment, component 122 retrieves past accidental events from knowledge corpus 310. In some embodiments, the knowledge corpus is based on publicly sourced data, predetermined data, and/or previously encountered accidental events.

Component 122 may generate a map of the identified aggravation objects based on the received video and sensor feedback, retrieved historic accidental event data, and object mapping 312. Object mapping 312 may be generated from sensors 304 and scanners 306 or object mapping 312 may be predetermined. In the depicted embodiment, component 122 executes aggravation object analysis 314 on the identified aggravation objects. In various embodiments, aggravation object analysis 314 comprises analyzing and determining the potential energy generation and stored energy of the identified aggravation object(s). Component 122 may estimate, based on aggravation object data stored in a knowledge corpus (aggravation object knowledge corpus 316), the potential energy within the accidental event aggravation objects and estimate, via sensor(s) 304 (e.g., an IoT-enabled system), how much energy is stored within the identified aggravation objects and the accidental event.

Component 122 may predict the propagation path of an accidental event (i.e., predicted propagation path (propagation path) 318). In various embodiments, component 122 analyzes the predetermined surroundings and accordingly identifies the propagation pattern, propagation speed, and direction of the accidental event. In the depicted embodiment, component 122 predicts the propagation path 318 by identifying and analyzing, via sensor(s) 304 and scanners 306, the relative distance 320 and relative direction 322 of the aggravation objects, degree of potential energy 324, and static versus dynamic objects 326. Relative direction 322 comprises component 122 considering the relative direction of the identified objects, accident event propagation speed, and direction to predict the time required for the identified accidental event to reach and expose the identified objects. Degree of potential energy 324 may comprise component 122 estimating the degree of potential energy, relative distance, and direction and identifying the time required to get exposed and the degree of impact from exposure to the accidental event based on predetermined data received from a database (e.g., past accident knowledge corpus and/or aggravating object knowledge corpus), sensor(s) 304 and/or scanning enabled systems (scanners 306). Static versus dynamic object 326 may comprise component 122 determining whether the identified objects are static or if the identified objects are dynamic, wherein if the object is identified as dynamic then component 122 may isolate the object from the predetermined area. For example, if the aggravation objects are mounted on structure, then those objects will be static, and are not mounted can be isolated physically.

In the depicted embodiment, component 122 determines if one or more aggravation objects should be moved, removed, or isolated 328. Component 122 may identify which aggravation object will be removed from a predetermined area (e.g., a predetermined distance from the accidental event and/or the accidental events predicted propagation path. In the depicted embodiment, if component 122 determines that none of the aggravation objects can or should be moved or removed than component 122 monitors the accidental event. However, in the depicted embodiment, if component 122 determines that one or more of the aggravation objects can or should be moved, then component 122 identifies any predetermined robotic system, mechanical system, and/or end user action that can be applied to move the aggravation objects. For example, component 122 identifies an available automated guided vehicle from a predetermined list and assigns an automated guided vehicle to transport the designated aggravation object to a predetermined location away from the accidental event, wherein a user or robotic system loads the aggravation object onto the automated guided vehicle and the automated guided vehicle transports the loaded aggravation object to the predetermined location. In some embodiments, component 122 may retrieve and implement mitigation actions and tactics associated with previous accidental events stored on one or more databases that are similar or the same as the current accidental event, wherein similar or same events are events that are within a predetermined range of confidence and/or within a predetermined category of events.

In the depicted embodiment, component 122 takes proactive action 334 toward the aggravation object based on the identified predetermined mitigation action (e.g., robotic or end user action), wherein the mitigation action may be physical and/or digital. In various embodiments, component 122 proactively executes the one or more predetermined robotic or end user actions. In various embodiments, component 122 proactively removes the aggravation objects from the predetermined area by executing and managing a robotic action and/or instructing an end user to move the aggravation object to a predetermined secondary location, wherein the predetermined secondary location comprises predetermined safety considerations. In the depicted embodiment, proactive action 334 receives input from direction of the proposed propagation of damage 340 associated with the accidental event, obstacles 342 defined mitigation steps and speed 336, and risk of the mitigation steps 338 to identify one or more proactive mitigating actions and prior to implementing the proactive mitigation actions to the aggravating object and/or accidental event.

Defined mitigation steps and speed 336 may comprise component 122 identifying the mitigation steps and the speed of the identified mitigation steps, wherein the identified mitigation steps and speed of the identified mitigation steps are predefined and retrieving from a database. Direction of the proposed propagation of damage 340 may comprise component 122 identifying the direction of propagation of the accidental event and identifying and labeling one or more aggravation objects in the path of the accidental event that should be mitigated. Obstacle 342 usage and potential placement of the obstacle may comprise component 122 implementing and/or generating obstacles to proactively disconnect the accidental event propagation medium. For example, in relation to a physical obstacle, there may be a physical barrier that may impede one physical location to another physical location. A digital barrier may be a digital blocker that may cause a use case anomaly that would not be treated properly within a digital space (e.g., virus, firewall, etc.).

Proactive accidental event management (proactive action) 334 may comprise component 122 evaluating the accidental event to determine if the accidental event can be contained or remedied based on the applied mitigation action. For example, based on the rate of control of the accidental event, component 122 dynamically implements mitigation action associated with the accidental event and aggravation objects.

In the depicted embodiment, component 122 performs iterative review of mitigation action 344 and replication and monitoring 346 of the implemented mitigation action. In various embodiments, component 122 continues to continue to replicate scenario planning every time an aggravating object is introduced into a new situation or environment which will enable the accidental event and mitigation action progress monitoring to be ongoing and iterative in nature. Component 122 may aggregate and store the data associated with a current accidental event and mitigation action (e.g. type of accidental event, severity, amount of damage, identified mitigation objects, implemented mitigation objects, robotic or end user actions, generated metadata, number of repetitive actions, etc.) and store the data associated with a current accidental event and mitigation action to a database (e.g., past accident knowledge corpus) for later reference or implementation. In some embodiments, component 122 evalutes the success of the an implementation based a comparison of cost and damage, wherein the implementation of a mitigation action is successful if the repair cost and amount or degree of damage or low relative to other implemented mitigation actions for the same or similar accidental event.

Component 122 may take temperature and climate into consideration when defining the scope 302, analyzing an environment (a predetermined area), evaluating an accidental event, and identifying and implements one or more mitigation actions. In various embodiments, component 122 considers predetermined or scheduled risk-based events (e.g., celebrations, maintenance, etc.) that may contribute to the accidental event. Component 122, via image recognition technology, may scan labels and generate, if applicable, a suggested translation and description of any symbols or warnings associated with the label and/or object, wherein component 122 may print the translated labels.

Based on at least the information provided above in FIGS. 1A-1C, component 122 improves the art by reducing cost and improving learning efficiency by reducing the amount of required time to generate and mange educational training and learning tools, and by efficiently enabling a user to process and receive the targeted information.

Figure 4:
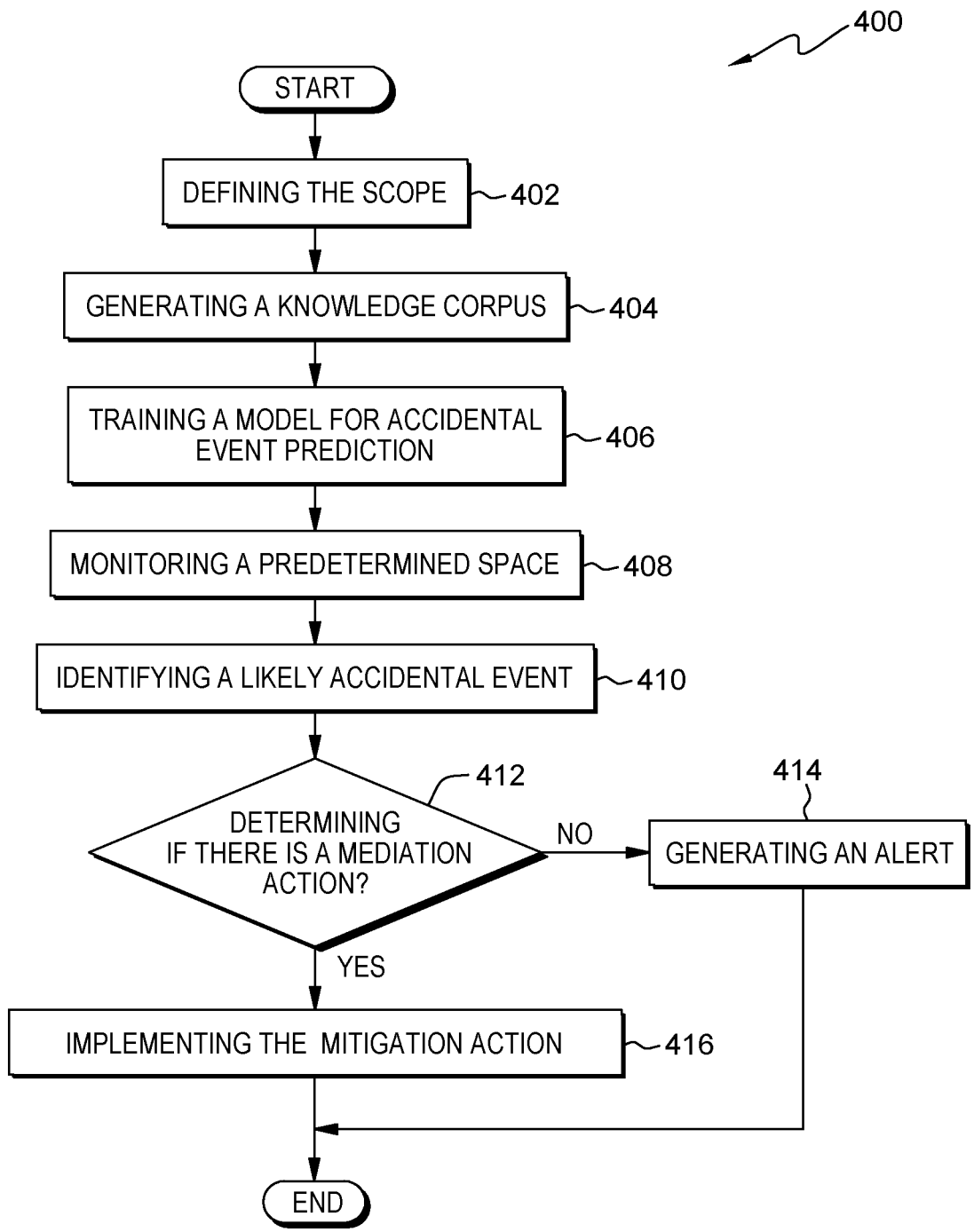
FIG. 4 illustrates operational steps of the risk assessment and management component, on a server computer within the distributed data processing environment of FIGS. 1A-1B, for computer-based risk assessment and management within a predetermined area, in accordance with an embodiment of the present invention.

FIG. 4 illustrates operational steps of component 122, in communication with server computer 120, within distributed data processing environment 400, for computer based risk assessment and management within a predetermined area, in accordance with an embodiment of the present invention. FIG. 4 provides an illustration of one implementation and does not imply any limitations with regard to the environments in which different embodiments may be implemented. Many modifications to the depicted environment may be made by those skilled in the art without departing from the scope of the invention as recited by the claims.

In step 402, component 122 defines the scope. In various embodiments, component 122 defines the scope by utilizing internet of things (IoT) scanning and thermal imaging. In various embodiments, component 122, via IoT devices and sensors and various scanning enabled systems (e.g., thermal scan), analyzes the received video feed and sensor feedback to identify an accidental event within a predetermined area and generates a defined scope of the layout of the predefined area and objects within the predefined area based on the output of the analyzed video feed and sensor feedback.

In step 404, component 122 generates a knowledge corpus. In various embodiments, component 122 generates one or more knowledge corpus, wherein the knowledge corpus comprises physical and chemical properties of objects in a physical space, potential hazards caused by interactions between the objects; potential hazards caused by environmental conditions in the physical space, and historical data about causes and outcomes of accidents occurring in the physical space.

In step 406, component 122 trains a model for accidental event prediction. In various embodiments, component 122 trains one or more models to predict accidental events in a predetermined area/space based on the knowledge corpus.

In step 408, component 122 monitors a predetermined space. In various embodiment, component 122 monitors a predetermined space/area, wherein monitoring comprises collecting, via sensing devices and/or monitoring application, information related to the environmental conditions and spatial relationships between the one or more objects in a predetermined area.

In step 410, component 122 identifies a likely accidental event. In various embodiments, component 122 identifies based on the model and the monitoring a likely accidental event in the predetermined area. In various embodiments, component 122 identifies an active accidental event.

In step 412, component 122 determines if the is a mediation action. In various embodiments, component 122 determines if there are one or more mediation actions that are applicable to an active or anticipated accidental event. In the depicted embodiment, if component 122 identifies that there are no mediation actions that are applicable to an active or anticipated accidental event (No step) then component 122 advances to step 414. However, in the depicted embodiment, if component 122 identifies that there are one or more mediation actions that are applicable to an active or anticipated accidental event (Yes step) then component 122 advances to step 416. The one or more mediation actions may be automated, predetermined, and/or retrieved from the generated knowledge corpus or a shared or local database.

In step 414, component 122 generates an alert. In various embodiments, responsive to determining there are no that are applicable to an active or anticipated accidental event, component 122 generates an alert, wherein the generated alert is a responsive prompt that queries an end user to provide or manage one or more mitigation actions or to remedy the identified accidental event.

In step 416, component 122 implements an identified mitigation action. In various embodiments, component 122 implements and/or manages one or more of the identified mitigation actions to contain/limit and/or terminate the identified accidental event.

Figure 5:
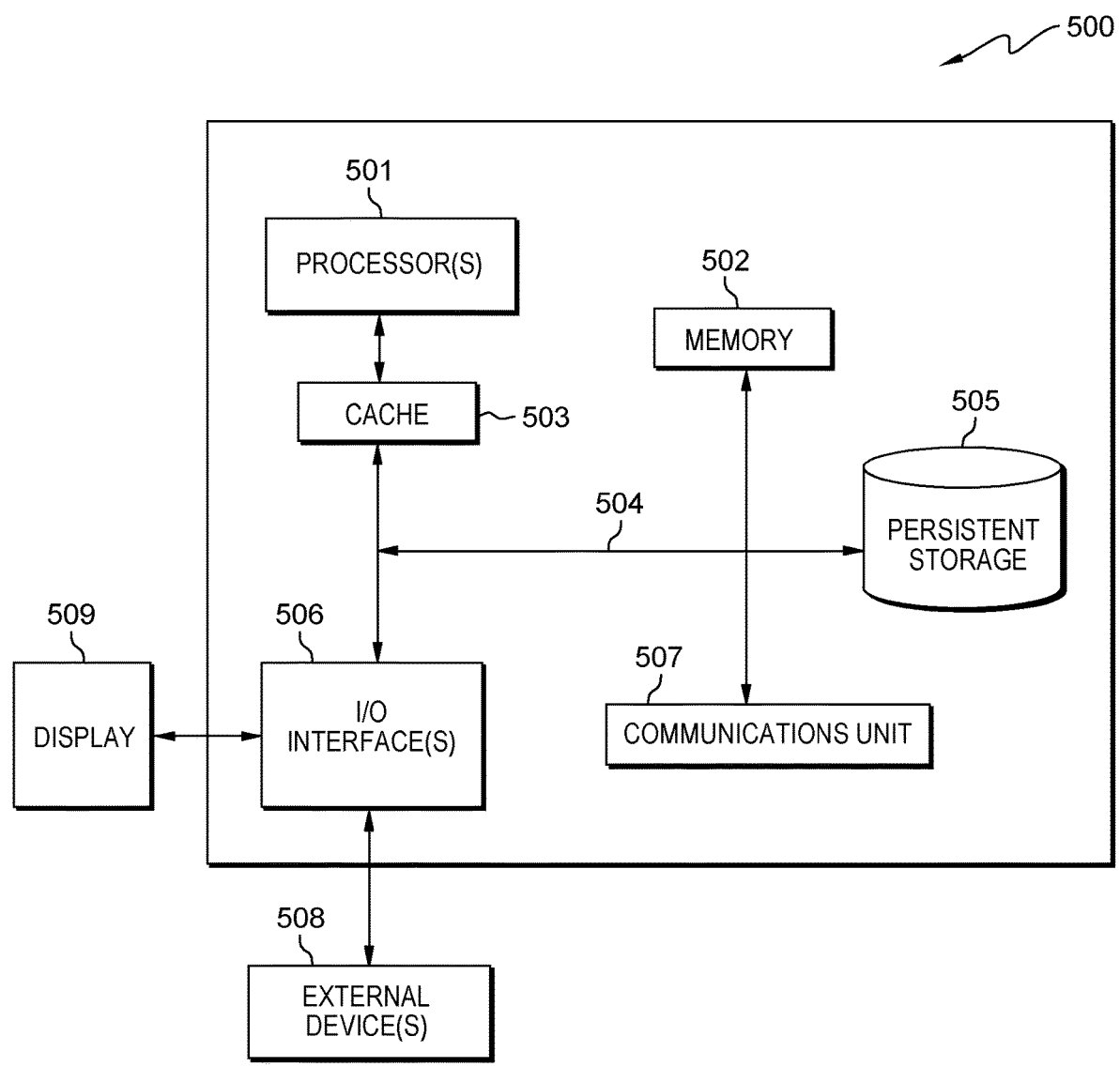
FIG. 5 depicts a block diagram of components of the server computer executing the risk assessment and management component within the distributed data processing environment of FIG. 1, in accordance with an embodiment of the present invention.

FIG. 5 depicts a block diagram of components of server computer 120 within distributed data processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

FIG. 5 depicts computer system 500, where server computer 120 represents an example of computer system 500 that includes component 122. The computer system includes processors 501, cache 503, memory 502, persistent storage 505, communications unit 507, input/output (I/O) interface(s) 506, display 509, external device(s) 508 and communications fabric 504. Communications fabric 504 provides communications between cache 503, memory 502, persistent storage 505, communications unit 507, and input/output (I/O) interface(s) 506. Communications fabric 504 may be implemented with any architecture designed for passing data and/or control information between processors (such as microprocessors, communications, and network processors, etc.), system memory, peripheral devices, and any other hardware components within a system. For example, communications fabric 504 may be implemented with one or more buses or a crossbar switch.

Memory 502 and persistent storage 505 are computer readable storage media. In this embodiment, memory 502 includes random access memory (RAM). In general, memory 502 may include any suitable volatile or non-volatile computer readable storage media. Cache 503 is a fast memory that enhances the performance of processors 501 by holding recently accessed data, and data near recently accessed data, from memory 502.

Program instructions and data used to practice embodiments of the present invention may be stored in persistent storage 505 and in memory 502 for execution by one or more of the respective processors 501 via cache 503. In an embodiment, persistent storage 505 includes a magnetic hard disk drive. Alternatively, or in addition to a magnetic hard disk drive, persistent storage 505 may include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 505 may also be removable. For example, a removable hard drive may be used for persistent storage 505. Other examples include optical and magnetic disks, thumb drives, and smart cards that are inserted into a drive for transfer onto another computer readable storage medium that is also part of persistent storage 505.

Communications unit 507, in these examples, provides for communications with other data processing systems or devices. In these examples, communications unit 507 includes one or more network interface cards. Communications unit 507 may provide communications through the use of either or both physical and wireless communications links. Program instructions and data used to practice embodiments of the present invention may be downloaded to persistent storage 505 through communications unit 507.

I/O interface(s) 506 enables for input and output of data with other devices that may be connected to each computer system. For example, I/O interface 506 may provide a connection to external devices 508 such as a keyboard, keypad, a touch screen, and/or some other suitable input device. External devices 508 may also include portable computer readable storage media such as, for example, thumb drives, portable optical or magnetic disks, and memory cards. Software and data used to practice embodiments of the present invention may be stored on such portable computer readable storage media and may be loaded onto persistent storage 505 via I/O interface(s) 506. I/O interface(s) 506 also connect to display 509.

Display 509 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium may be any tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures (i.e., FIG.) illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method for risk assessment and management within a predetermined area, the computer-implemented method comprising:
    monitoring the predetermined area, wherein monitoring comprises:
        collecting, by one or more sensing devices, data related to environmental conditions and spatial relationships between one or more objects in the predetermined area; and
        retrieving a preestablished object list from one or more databases or one or more data repositories;
    determining, based on a model, the preestablished object list and the monitoring, that an accidental event is likely to occur within a predetermined distance or within the predetermined area, wherein determining that an accidental event is likely to occur comprises:
        executing, by one or more processors, a computer risk-based analysis to identify potential threats;
        estimating a degree of potential energy of objects from the preestablished object list based on the risk based analysis and predetermined data received from a database;
        identifying a required time of exposure to the identified potential threats required to release the degree of potential energy and a degree of impact from the exposure to the identified potential threats based on the risk based analysis and predetermined data received from a knowledge corpus;
    identifying, by the one or more processors, a predetermined mitigation action from the knowledge corpus to apply to the accidental event and the objects from the preestablished object list based on the risk based analysis based on the identified potential threats and the identified degree of potential energy of the objects; and
    proactively implementing the identified predetermined mitigation action to prevent or manage the accidental event, wherein the proactive implementation comprises:
        initiating, by the one or more processors, a robotic system and computer-based control settings; and
        utilizing the robotic arm to isolate the objects from the preestablished object list from the predetermined area to prevent the identified potential threats, wherein isolating the objects comprises:
            utilizing the robotic arm to load the objects onto an automated guided vehicle; and
            utilizing the automated guided vehicle to transport the objects to a predetermined location that is a predetermined distance from the identified potential threats.

2. The computer-implemented method of claim 1, further comprising:
    analyzing program instructions to analyze a received video feed and a received sensor feedback from internet of things devices, sensors and various scanning enabled systems to identify an accidental event within a predetermined area; and
    generating a defined scope of a layout of the predetermined area and the one or more objects within the predetermined area based on an output of the analyzed video feed and sensor feedback.

3. The computer-implemented method of claim 1, further comprising:
    generating the knowledge corpus, based on received video feedback, sensor feedback, implemented mitigation actions, the accidental event, one or more aggravation objects, and amount of damage from the accidental event, wherein the knowledge corpus comprises physical and chemical properties of the one or more objects in a physical space, potential hazards caused by interactions between the one or more objects, potential hazards caused by environmental conditions in the physical space, and historical data about causes and outcomes of accidents occurring in the physical space.

4. The computer-implemented method of claim 3, further comprising:
    training a model for predicting accidental events in a predetermined areas based on the knowledge corpus.

5. The computer-implemented method of claim 1, further comprising:
    identifying, based on a type or category of an identified aggravation object, that the aggravation object should be covered with a predetermined protective layer or that the identified aggravation object should be removed from the predetermined area to prevent or reduce an impact of an anticipated or active accidental event.

6. The computer-implemented method of claim 1, wherein mitigation action comprises: executing and managing a digital system and a mechanical system.

7. The computer-implemented method of claim 1, further comprising:
evaluating the accidental event to determine if the accidental event can be contained or remedied based on the implemented mitigation action, wherein based on an identified rate of control of the accidental event, dynamically implementing or reducing the mitigation action associated with the accidental event and aggravation objects.

8. A computer system for risk assessment and management within a predetermined area, the computer system comprising:
one or more computer processors;
one or more computer readable storage devices;
program instructions stored on the one or more computer readable storage devices for execution by at least one of the one or more computer processors, the stored program instructions comprising:
program instructions to monitor the predetermined area, wherein monitoring comprises:
program instructions to collect, by one or more sensing devices, data related to environmental conditions and spatial relationships between one or more objects in the predetermined area; and
program instructions to retrieve a preestablished object list from one or more databases or one or more data repositories;
program instructions to determine, based on a model, the preestablished object list and the monitoring, that an accidental event is likely to occur within a predetermined distance or within the predetermined area, wherein determining that an accidental event is likely to occur comprises:
program instructions to execute, by one or more processors, a computer risk-based analysis to identify potential threats;
program instructions to estimating a degree of potential energy of objects from the preestablished object list based on the risk based analysis and predetermined data received from a database;
program instructions to identify a required time of exposure to the identified potential threats required to release the degree of potential energy and a degree of impact from the exposure to the identified potential threats based on the risk based analysis and predetermined data received from a knowledge corpus;
program instructions to identify, by the one or more processors, a predetermined mitigation action from the knowledge corpus to apply to the accidental event and the objects from the preestablished object list based on the risk based analysis based on the identified potential threats and the identified degree of potential energy of the objects; and
program instructions to proactively implement the identified predetermined mitigation action to prevent or manage the accidental event, wherein the proactive implementation comprises:
program instructions to initiate, by the one or more processors, a robotic system and computer-based control settings; and
program instructions to utilize the robotic arm to isolate the objects from the preestablished object list from the predetermined area to prevent the identified potential threats, wherein isolating the objects comprises:
program instructions to utilize the robotic arm to load the objects onto an automated guided vehicle; and
program instructions to utilize the automated guided vehicle to transport the objects to a predetermined location that is a predetermined distance from the identified potential threats.

9. The computer system of claim 8, further comprising:
program instructions to analyze a received video feed and a received sensor feedback from internet of things devices, sensors and various scanning enabled systems to identify an accidental event within a predetermined area; and
program instructions to generate a defined scope of a layout of the predetermined area and the one or more objects within the predetermined area based on an output of the analyzed video feed and sensor feedback.

10. The computer system of claim 8, further comprising:
program instructions to generate the knowledge corpus, based on received video feedback, sensor feedback, implemented mitigation actions, the accidental event, one or more aggravation objects, and amount of damage from the accidental event, wherein the knowledge corpus comprises physical and chemical properties of the one or more objects in a physical space, potential hazards caused by interactions between the one or more objects, potential hazards caused by environmental conditions in the physical space, and historical data about causes and outcomes of accidents occurring in the physical space.

11. The computer system of claim 10, further comprising:
program instructions to train a model for predicting accidental events in a predetermined areas based on the knowledge corpus.

12. The computer system of claim 8, further comprising:
program instructions to identify, based on a type or category of an identified aggravation object, that the aggravation object should be covered with a predetermined protective layer or that the identified aggravation object should be removed from the predetermined area to prevent or reduce an impact of an anticipated or active accidental event.

13. The computer system of claim 8, wherein mitigation action comprises:
program instructions execute and manage a digital system and a mechanical system.

14. The computer system of claim 8, further comprising:
program instructions to evaluate the accidental event to determine if the accidental event can be contained or remedied based on the implemented mitigation action, wherein based on an identified rate of control of the accidental event, dynamically implementing or reducing the mitigation action associated with the accidental event and aggravation objects.

15. A computer program product for risk assessment and management within a predetermined area, the computer program product comprising:
one or more computer readable storage devices and program instructions stored on the one or more computer readable storage devices, the stored program instructions comprising:
program instructions to monitor the predetermined area, wherein monitoring comprises:
program instructions to collect, by one or more sensing devices, data related to environmental conditions and spatial relationships between one or more objects in the predetermined area; and program instructions to retrieve a preestablished object list from one or more databases or one or more data repositories;

program instructions to determine, based on a model, the preestablished object list and the monitoring, that an accidental event is likely to occur within a predetermined distance or within the predetermined area, wherein determining that an accidental event is likely to occur comprises:

program instructions to execute, by one or more processors, a computer risk-based analysis to identify potential threats;

program instructions to estimating a degree of potential energy of objects from the preestablished object list based on the risk based analysis and predetermined data received from a database;

program instructions to identify a required time of exposure to the identified potential threats required to release the degree of potential energy and a degree of impact from the exposure to the identified potential threats based on the risk based analysis and predetermined data received from a knowledge corpus;

program instructions to identify, by the one or more processors, a predetermined mitigation action from the knowledge corpus to apply to the accidental event and the objects from the preestablished object list based on the risk based analysis based on the identified potential threats and the identified degree of potential energy of the objects; and program instructions to proactively implement the identified predetermined mitigation action to prevent or manage the accidental event, wherein the proactive implementation comprises:

program instructions to initiate, by the one or more processors, a robotic system and computer-based control settings; and program instructions to utilize the robotic arm to isolate the objects from the preestablished object list from the predetermined area to prevent the identified potential threats, wherein isolating the objects comprises:

program instructions to utilize the robotic arm to load the objects onto an automated guided vehicle; and program instructions to utilize the automated guided vehicle to transport the objects to a predetermined location that is a predetermined distance from the identified potential threats.

16. The computer program product of claim 15, further comprising:

program instructions to analyze a received video feed and a received sensor feedback from internet of things devices, sensors and various scanning enabled systems to identify an accidental event within a predetermined area; and program instructions to generate a defined scope of a layout of the predetermined area and the one or more objects within the predetermined area based on an output of the analyzed video feed and sensor feedback.

17. The computer program product of claim 15, further comprising:

program instructions to generate the knowledge corpus, based on received video feedback, sensor feedback, implemented mitigation actions, the accidental event, one or more aggravation objects, and amount of damage from the accidental event, wherein the knowledge corpus comprises physical and chemical properties of the one or more objects in a physical space, potential hazards caused by interactions between the one or more objects, potential hazards caused by environmental conditions in the physical space, and historical data about causes and outcomes of accidents occurring in the physical space; and program instructions to train a model for predicting accidental events in a predetermined areas based on the knowledge corpus.

18. The computer program product of claim 15, further comprising:

program instructions to identify, based on a type or category of an identified aggravation object, that the aggravation object should be covered with a predetermined protective layer or that the identified aggravation object should be removed from the predetermined area to prevent or reduce an impact of an anticipated or active accidental event.

19. The computer program product of claim 15, wherein mitigation action comprises:

program instructions execute and manage a digital system and a mechanical system.

20. The computer program product of claim 15, further comprising:

program instructions to evaluate the accidental event to determine if the accidental event can be contained or remedied based on the implemented mitigation action, wherein based on an identified rate of control of the accidental event, dynamically implementing or reducing the mitigation action associated with the accidental event and aggravation objects.

* * * * *